United States Patent [19]

Franke

[11] Patent Number: 4,699,686
[45] Date of Patent: Oct. 13, 1987

[54] CARPET SEAMING TOOL

[76] Inventor: Thomas C. Franke, 985 Ridge Ave., Elk Grove Village, Ill. 60007

[21] Appl. No.: 725,577

[22] Filed: Apr. 22, 1985

[51] Int. Cl.⁴ .............................................. B32B 35/00
[52] U.S. Cl. ........................................ 156/579; 38/74;
156/304.4; 156/498; 156/574
[58] Field of Search ...................... 156/579, 304.4, 498,
156/502, 505, 574, 304.7; 15/235.4; 38/74, 93

[56] References Cited

U.S. PATENT DOCUMENTS

| | | | |
|---|---|---|---|
| 184,881 | 11/1876 | Mahony | 38/93 |
| 3,140,500 | 7/1964 | Pilla | 15/235.4 |
| 3,472,725 | 10/1969 | Evans | 156/579 |
| 4,375,709 | 3/1983 | Lewis | 15/235.4 |

*Primary Examiner*—Michael Wityshyn
*Attorney, Agent, or Firm*—Arno Wm. Lemke

[57] ABSTRACT

The disclosed tool has a base plate with opposed upper and lower faces. A handle is mounted off the upper face. A layer of an anti-friction material may be present on the lower face of the base plate. The base plate has a plurality of through holes between the upper and lower faces, arranged in a closely spaced array over the whole lower face. Other than the interruption these holes may provide, the lower face is flat and smooth. The tool is used with the lower face being placed on, pressed against, and moved along a connecting seam, from the upper side of the carpet, that is being established between two adjacent carpet pieces by means of a lapping tape having a heat-activated adhesive thereon, which upon cooling becomes bonded to the carpet edges. The tool effectively holds the carpet pieces in place while the adhesive is cooling and simultaneously dissipates heat from the carpet and seam to set the seam quickly.

15 Claims, 4 Drawing Figures

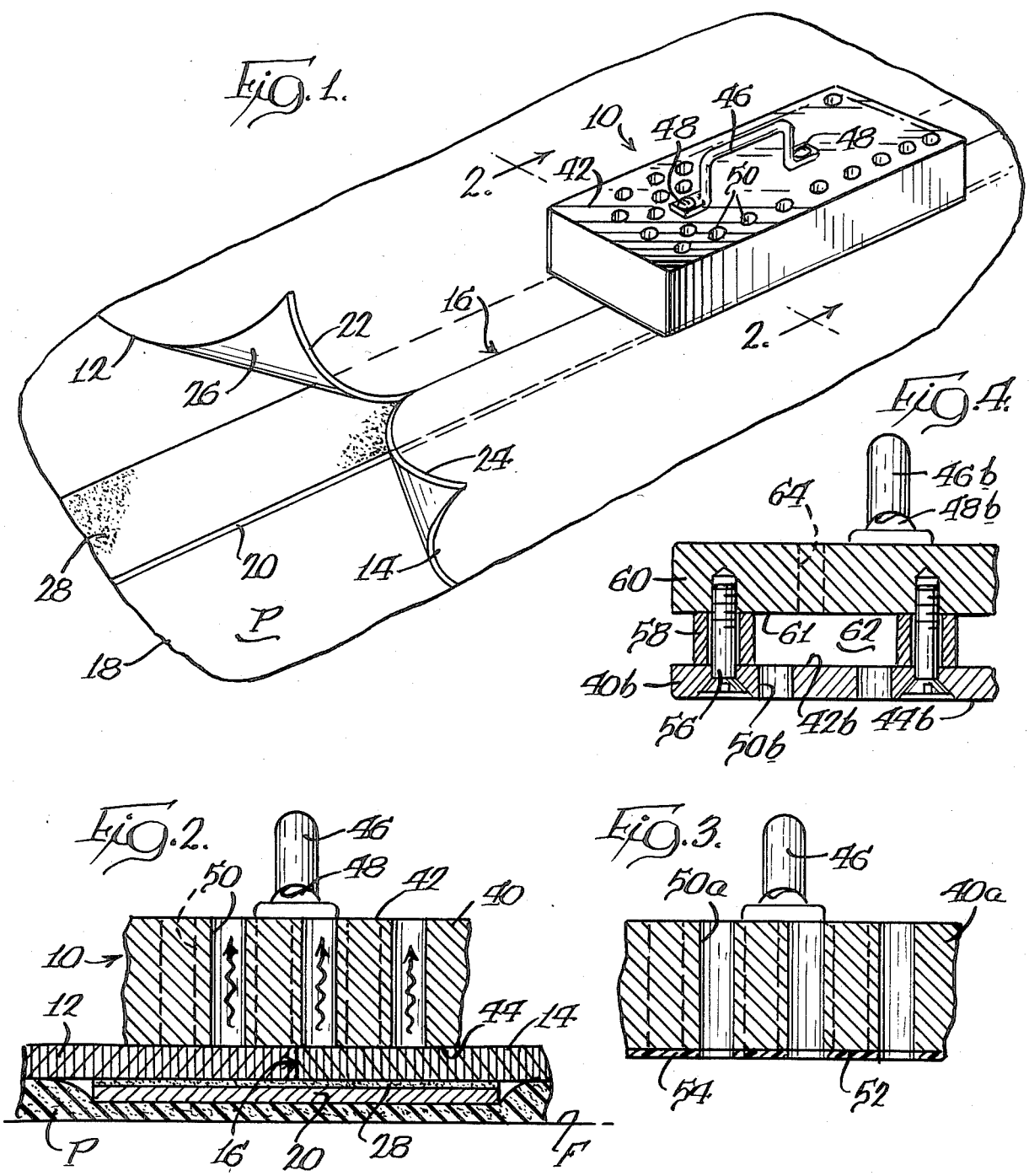

CARPET SEAMING TOOL

FIELD OF THE INVENTION

This invention relates to a tool for holding, and simultaneously cooling, a connecting seam between butted edges of separate carpet pieces, formed by a lapped strip of tape having a heat-activated adhesive thereon, that upon being cooled sufficiently sets up to bond the edges and establish the carpet seam.

BACKGROUND OF THE INVENTION

It is common to connect separate adjacent pieces of carpet to each other along a seam formed across the butted edges of the pieces, with a strip of tape being extended along the edges and being lapped over and bonded to the edges. For large carpet pieces that are difficult to move about, such as with wall-to-wall carpeting, where each piece of carpet may be 12 or 15 feet wide, it is desirable to secure the tape to the carpet pieces while the pieces are each laid in place on the supporting floor surface. This means that the carpet backing is against the supporting floor surface or cushioning pad, and the heat-activated seam tape is under the carpet pieces and against the carpet backing as the pieces are being butted together to orient the seam. This means also that the seam tape is completely hidden on the underside of the carpet after the seam has been established; and that all efforts to secure the seam must be taken from the upper side of the carpet, and then only through the carpet itself.

In establishing the seam, a heat-sensitive adhesive or hot-melt substance, on the face of the tape, is positioned against the carpet backing and is heated to become tacky. The carpet pieces are then pressed against the tacky surface of the tape to provide good proximate contact and probable bonding at the seam. U.S. Pat. Nos. 3,660,191 and 4,438,323 illustrate heaters of the type that can be used to heat the tape sufficiently to activate the adhesive; and U.S. Pat. No. 4,439,904 illustrates a roller tool of the type that can be rolled back and forth over the seam to establish good proximate contact between the tape and carpet backing.

One problem in establishing a seam as noted, however, is that the adhesive does not set immediately to secure the seam, but must be cooled down considerably. For example, the temperature to which the tape is heated to activate the adhesive may be between 250 degrees and 300 degrees Fahrenheit. Although some holding power is provided with the tape at this temperature, the carpet pieces and tape really need to be held together under some pressure until the adhesive has cooooled to perhaps below 150 degrees to 200 degrees Fahrenheit. In practice, this may be accomplished by moving a roller tool repeatedly back and forth over the seam until the adhesive sets sufficiently. This can make the pace of setting up the seam quite slow and laborious.

In an effort to speed up the pace and ease the work effort, many professional carpet layers have tried placing a weight on the formed seam, so as to hold the carpet pieces in place until the adhesive cools sufficiently and sets. The weight then may be progressively moved or "inched" along the seam, at the same or related pace as the seam ahead is being initially established. A tool box or tray from a tool box is frequently used as such a weight, as it may seem to provide enough size and cover a fairly extensive length along the seam and enough weight to hold the carpet pieces in place across the seam.

However, the use of such a weight frequently has created unwanted and highly detrimental results. As examples, the exposed face of the carpet under the weight frequently can become "matted", "puckered-up", or discolored, or the seam itself can not hold to cause seam separation. Each or all of these problems by itself not only may be severe; but the same frequently may not even be dectected until long after the weight has been removed and the carpet has cooled down to room temperature. This embarassingly may be too late, and/or quite costly to correct, as many additional linear feet of carpet seams may also have been finished by the time the detrimental results are discovered. Moreover, the weight may trap heat in the underlying carpet seam, to provide that its use questionably might not even increase the pace of establishing the seam and often might cause seam separation because the seam is not set.

OBJECTS OF THE INVENTION

One object of the present invention is to provide a tool that can be used in the seaming of two carpet pieces, with minimum risk of causing the carpet to become puckered-up or discolored, or of causing seam separation, because of the use of the tool.

Another object of this invention is to provide a tool that can be placed over the hot, unset seam between two carpet pieces, to hold the pieces in place while the adhesive cools sufficiently to set the seam.

Another object of this invention is to provide a tool, according to the previous object, that when placed over the hot, unset seam between two carpet pieces, tends to cool the carpet more rapidly than without the tool, to set the adhesive more rapidly and provide that the seam thereby can be established at a faster rate.

Another object of this invention is to provide a tool, according to all of the previous objects, that increases the productivity and reliablity of the carpet layer and simultaneously reduces the burden and work effort of the task of seaming carpet pieces together.

SUMMARY OF THE INVENTION

To achieve these and other objects, the present invention may provide a tool having a base plate with opposed upper and lower faces, said lower face being flat and smooth. A handle may be mounted relative to or off the upper side of the base plate. The base plate may have a plurality of through holes between the upper and lower faces, said holes being arranged in a closely spaced array over the whole lower face of the base plate. The tool may be adapted to be placed on, pressed against, and moved along the seam from the upper side of the carpet, extended over the tape on both adjacent carpet pieces at the seam and along the length of the seam. The tool thus operates to hold the carpet pieces in place and simultaneously to dissipate heat from the carpet to cool the later quickly and to set the seam.

The base plate may be made of a durable, heat conductive material, such as cast metal or stainless steel (preferably of a non-rusting metal, or having a coating on the metal to prevent rust from occuring); or of a non-rusting, durable plastic such as plexiglass. With a metal base plate, a layer of an anti-friction material may be provided on the lower face of the base plate to ease the movement of the tool along the carpet seam. The anti-friction material may be made of a sheet of plexiglass secured to the base plate, or may be in the form of a film of Teflon adherred directly to the base plate.

The through holes may have an open-ness ratio between 0.1 and 0.5, and each of said holes may be between 0.2 and 0.5 inches in diameter. The base plate may have a width between 3 and 10 inches and a length between 8 and 20 inches. The base plate and handle assembly may have a combined weight between 2 and 20 pounds. A separate weight plate may be attached or secured to the base plate to provide this required weight range.

BRIEF DESCRIPTION OF THE DRAWINGS

Further objects, advantages and features of the present invention will appear from the following disclosure and description, which includes the accompanying drawings, in which:

FIG. 1 is a diagramatic perspective view showing a pair of adjacent carpet pieces to be butted and connected together across a seam, and showing a tool to be described as an illustrative embodiment of the invention in operative arrangement with the seam as it is being established.

FIG. 2 is an enlarged fragmentary sectional view of one embodiment of the tool, as seen generally from line 2—2 in FIG.1; and FIGS. 3 and 4 are enlarged fragmentary sectional views, similar to FIG. 2, except of second and third embodiments of the tool.

DESCRIPTION OF PREFERRED EMBODIMENTS OF THE INVENTION

The disclosed tool 10 is used for connecting two carpet pieces 12 and 14 together across a seam 16, from the upper side of the carpet as it may be laid in place on the supporting surface 18, be it the floor "F" or cushioning pad "P". Normally, a strip of tape 20 may be used, extending along the edges 22 and 24 of the carpet pieces 12 and 14 respectively, and lapping over part of the adjacent edges of the carpet pieces; against the underside or backing 26 of the carpet pieces. The tape 20 has a heat-sensitive adhesive 28, or hot-melt substance, on its side which is directly contacting the carpet backing.

Heat may be applied to the tape 20 (and adhesive 28 thereon) with an electrically heated tool (not shown) of the type mentioned previously and disclosed in the U.S. Pat. Nos. 3,660,191 and 4,438,323. Upon the application of heat, the adhesive 28 becomes tacky to allow for potential bonding of the carpet pieces 12 and 14 to the tape 20. Pressure may be applied to the carpet pieces and tape, again with a common roller tool (not shown) of the type mentioned previously and disclosed in U.S. Pat. No. 4,439,904, or an equivalent or related tool, so as to provide good proximate contact between the tape and the carpet. The tacky tape provides some adhesion to the carpet pieces along the seam; but this seam bond is inadequate to hold the carpet pieces together across the seam immediately, and the seam becomes stronger as the adhesive cools. As noted, pressure may be continuously applied with the roller tool over some extended duration until this adhesive cooling takes place, but this represents a slow setting seam and consequently a slow seam establishing pace, and it also represents a high level of work effort.

As the carpet and adjacent tape may be heated to temperatures as high as 300–350 degrees Fahrenheit, and possibly even higher; and as the carpet material generally has poor heat conductivity, the heat normally is retained in the carpet at the seam for some duration. Thus, the adhesive does not set immediately, but only gradually as both the carpet and the adhesive cool.

Some professional carpet layers have tried then to place a weight on the carpet, over the seam, to hold the seam tight for the duration needed to cool the adhesive sufficiently. However, unless extreme care is taken (and sometimes even though extreme care has been taken), the carpet under the weight becomes matted, and/or becomes puckered-up, and in the most severe case becomes discolored; and frequently seam separation nonetheless occurs. Some of these undesirable effects can be corrected with special post-seaming treatments, but again this requires extra effort.

The disclosed tool 10 can apply pressure against the seam 16 as the adhesive is cooling to set the seam, and can simultaneously dissipate heat rapidly away from the carpet in the region of the seam, operable to set the seam quickly and provide an improved seam. The tool 10 thus allows for seaming along at a rapid pace for high work producitivity, and with good reliability, as the tool minimizes the risk of causing the carpet to become puckered-up or discolored, or of allowing the carpet pieces to separate before the seam sets up properly.

The tool 10 has a base plate 40 with opposed upper and lower faces 42 and 44 respectively. The lower face 44 is flat and smooth and may even be polished. A handle 46 is mounted relative to the base plate 40, secured by screws 48 threaded into taps in the base plate, the handle projecting up off the upper face 42 of the base plate. The base plate 40 has a plurality of through holes 50 between the upper and lower faces 42 and 44. The holes 50 may be arranged in a closely spaced array over the whole lower face 44 of the base plate 40.

Preferably, the holes 50 in the base plate may define an open-ness ratio between 0.1 and 0.5. This may be formed, for example, by having the holes 50 each of the same size, between 0.1 and 0.5 inches in diameter, and on centers of approximately between 1.2 and 3.0 times the diameter. As several specifics, 0.5 inch diameter holes might be formed on 0.75 inch centers in a square or diamond pattern array, to provide an open-ness ratio of approximately 0.35. The same size holes in a square or diamond pattern array, on 0.625 inch centers will provide an open-ness ratio of approximately 0.5, and on 1.0 inch centers will provide an open-ness ratio of approximately 0.2.

Three different embodiments are illustrated herein in FIGS. 2, 3 and 4. In the embodiment of the invention illustrated in FIG.2, the base plate 40 is rigid and homogeneous between the lower and upper faces, and the handle is secured directly to the base plate off the upper face.

In the embodiment of the invention illustrated in FIG. 3, a layer 52 of durable, anti-friction, non-rusting material may be provided over the lower face of the base plate 40a. The layer 52 likewise has a flat and smooth exposed face 54. As illustrated in FIG. 3, the layer 52 of anti-friction material may be in the form of a film of Teflon or equivalent adhered directly to the lower face of the base plate 40a. An alternative embodiment (not shown) may have the layer of anti-friction material formed as a rigid sheet of plexiglass (or equivalent durable, non-rusting plastic) secured by screws threaded into taps in the base plate flush against the lower face of the base plate; or as yet another alternative, the plexiglass could be bonded to the lose plate.

In the embodiment of the invention illustrated in FIG. 4, the base plate 40b may be in the form of a rigid sheet, such as of metal or of plexiglass or its equivalent, having a flat smooth lower face 44b and an upper face 42b. A separate weight plate 60 is also provided, as are screws 56 and spacers 58, the screws being fitted through holes in the base plate 40b and through the spacers 58 and threaded into taps in the weight plate 60. This secures the base plate 40b relative to the lower face of the weight plate 60, with clearance space 62 between the base plate and weight plates open to the edges of the plates. The handle 46b is secured relative to the base plate off the upper face thereof, by screws 48b threaded into taps in the weight plate 60.

In the base plate illustrated FIG. 3, the through holes 50a extend through both the base plate and the layer 52 of antifriction material. In the tool of FIG. 4, the holes 50b extend through the base plate 40b to the clearance space 62, and the weight plate 60 may or may not have any holes therethrough. Moreover, if holes are provided in the weight plate 60 (as is illustrated in phantom at 64), they need not provide an open-ness ratio as high as the open-ness ratio of the base plate holes 50b, as the heat and vapor escaping through the base plate holes 50b can pass via the clearance space 62 to the ambient atmosphere beyond the tool.

Moreover, in each of the embodiments, other than the slight interruptions that may be caused by the base plate holes 50, the exposed face of the base plate is flat and smooth.

A preferred base plate may have a width between 3 and 10 inches, and a length between 8 and 20 inches. This would provide generous coverage over the unset seam, both along the length of the seam and crosswise to the seam; while yet being small enough for convenient carriage from one location to another location. As a conventional seaming tape may be between approximately 0.75 and 4.0 inches wide, this tool 10 with a base plate 5.0 inches in width and 10 inches in length would provide approximately 0.35 square feet of coverage, over both the seam tape and the area of the carpet pieces immediately next to the seam, and for some distance along the seam.

The base plate may be between approximately 0.25 and 1.0 inches in thickness. This is for rigidity and strength, as well as for weight. The base plate may be formed of a heat conductive durable metal, preferably of a non-rusting metal such as stainless steel, or of a cast metal with a protective coating to prevent rusting of the metal; or may be formed of a durable plastic, such as plexiglass. The weight plate need only be formed of a structural material such as steel or cast metal. In forming a tool of this size and material, the tool may have a combined weight, considering the handle assembly, weight plate, and all, of between approximately 2 and 20 pounds.

SUMMARY OF THE OPERATION

In using the disclosed tool 10, the carpet layer would seam the carpet edges in the typical manner, by lapping the strip of tape 20 under the edges of the carpet pieces 12 and 14, with the adhesive on the tape 20 being directly against the carpet backing. The tape, with its adhesive, may then be heated to cause the adhesive to become tacky; and pressure would be applied against the lapped seam 16, such as with the roller tool. After the seam has been established, but before the adhesive has cooled sufficiently to have set, the tool 10 may be placed over the seam.

The tool 10 may be placed on, pressed against, and moved along the connecting carpet seam 16, from the upper side of the carpet, to simultanelusly extend over the tape 20 on both pieces 12 and 14 of the carpet at the seam and along the length of the seam. Additional weight may be applied to the tool 10 by the carpet layer pressing down on the handle 46, but this force need be applied for only a moment; and the tool can be left where it is, over the seam. The tool will generally have sufficient weight to hold the seam together while the adhesive is cooling.

The holes 50 allow the carpet under the tool 10 to breathe, heat and possibly moisture escaping from the carpet through the holes, to the ambient temperature. The large surface area of the base plate, via the many spaced holes, when placed over the carpet may act somewhat as a radiator to dissipate the heat away from the carpet and the underlying seam. This cooling allows the seam 16 to set up rapidly, whereupon the tool 10 can be moved or "inched" along the seam to overlie the yet unset seam. Having a base plate of metal material provides some additional cooling, by conduction from the carpet to the ambient atmosphere. The smoothness of the base plate surface allows movement of the tool with a minimum of effort and of disturbance of the carpet pieces.

The use of the tool 10 allows the seam 16 to be established and set at a much faster pace than without the tool, which increases the productivity of the carpet layer. Moreover, the seam 16 formed with the tool 10 is as secure as a seam formed without the use of the tool, and better than a seam formed with other known weight-like devices used for holding the unset seam; and does not tend to cause puckering-up, seam separation, or discoloring of the carpet, for improved reliability.

An even further advantage of the disclosed tool is the fact that in certain cases, it may be possible to use the tool 10 for establishing the proximate contact between the tape and the carpet backing. This would be done right after the seam had been established, and the carpet layer would place the tool over the finished seam and press down by pushing on the handle 46. The tool may then be left on the seam while the seam ahead of it is being established. This means that the carpet layer need not use a roller tool and could eliminate one labor step. This may be applicable on thinner carpets, or on carpets having a pad as part of the carpet backing which rests on the floor surface.

What I claim as my invention is:

1. For connecting two carpet pieces together across a seam, with a strip of tape lapping the adjacent edges of the pieces and a heat-activated adhesive on the tape bonding to the underside of the pieces upon the application of heat, a tool for simultaneously applying pressure against the seam as the seam is cooling and for rapidly dissipating the heat away from the cooling seam, comprising the combination of:

a base plate having opposed upper and lower faces, said lower face being flat and smooth,
   a handle means off the upper side of the base plate,
   said base plate having a width between approximately 3 and 10 inches and having a length between approximately 8 and 20 inches,
   said base plate and handle means having a combined weight between 2 and 20 pounds, said base plate also having a plurality of through holes between the upper and lower faces, said holes being arranged in a closely spaced array over the whole lower face of the base plate and having an open-ness ratio between 0.1 and 0.5, said holes each being between 0.2 and 0.5 inches in diameter, and said tool being adapted to be placed on, pressed against, and moved along the seam, from the upper side of the carpet, and simultaneously extend over the tape on both carpet pieces at the seam and along the length of the seam.

2. A tool for seaming adjacent carpet pieces according to claim 1, further including a layer of anti-friction material over the lower face of the base plate and likewise having a flat and smooth exposed face.

3. A tool for seaming adjacent carpet pieces according to claim 2, said layer of anti-friction material being in the form of a rigid sheet of the material having a flat and smooth face thereon, and means for securing the sheet to the lower face of the base plate with the flat and smooth face of the layer exposed.

4. A tool for seaming adjacent carpet pieces according to claim 2, said layer of anti-friction material being formed of Teflon adhered directly to the lower face of the base plate.

5. A tool for seaming adjacent carpet pieces according to claim 1, further having a weight plate, and means for securing the weight plate to the base plate off the upper face thereof and defining a clearance space between the base and weight plates open to the edges of the plates.

6. For connecting two carpet pieces together across a seam, with a strip of tape lapping the adjacent edges of the pieces and a heat-activated adhesive on the tape bonding to the underside of the pieces upon the application of heat, a tool for simultaneously applying pressure against the seam as the seam is cooling and for rapidly dissipating the heat away from the cooling seam, comprising the combination of:

a base plate having opposed upper and lower faces, said lower face being flat and smooth, a handle means off the upper side of the base plate, said base plate having a plurality of through holes between the upper and lower faces, said holes being arranged in a closely spaced array over the whole lower face of the base plate, said tool being adapted to be placed on, pressed against, and moved along the seam, from the upper side of the carpet, and to simultaneously extend over the tape on both carpet pieces at the seam and along the length of the seam, and a layer of anti-friction material on the lower face, said layer of anti-friction material likewise being flat and smooth.

7. A tool for seaming adjacent carpet pieces according to Claim 6, further including a layer of anti-friction material on the lower face of the base plate and being in the form of a rigid sheet of the material having the flat and smooth face thereon, and means for securing the sheet to the lower face of the base plate with the flat face of the layer exposed.

8. A tool for seaming adjacent carpet pieces according to claim 6, said layer of anti-friction material being in the form of a film of Teflon adhered directly to the lower face of the base plate.

9. A tool for seaming adjacent carpet pieces according to claim 6, further having a weight plate, and means for securing the weight plate to the base plate off the upper face thereof and defining a clearance space between the base and weight plates open to the edges of the plates.

10. A tool for seaming adjacent carpet pieces according to claim 9, said weight plate having a thickness of between 0.25 and and 1.0 inches, and the tool having a combined weight between 2 and 20 pounds.

11. A tool for seaming adjacent carpet pieces according to claim 10, said holes having an open-ness ratio between 0.1 and 0.5

12. A tool for seaming adjacent carpet pieces according to claim 6, said holes each being between 0.2 and 0.5 inches in diameter.

13. A tool for seaming adjacent pieces of carpet according to claim 12, said base plate having a width between approximately 3 and 8 inches and having a length between approximately 8 and 20 inches.

14. A tool for seaming adjacent carpet pieces according to claim 6, said holes over the area of the lower face having an open-ness ratio between 0.1 and 0.5.

15. A tool for seaming adjacent carpet pieces according to claim 14, said holes each being between 0.2 and 0.5 inches in diameter.

* * * * *